Aug. 21, 1934.  C. H. ZWERMANN  1,970,791
LAVATORY SUPPORT
Filed April 28, 1933
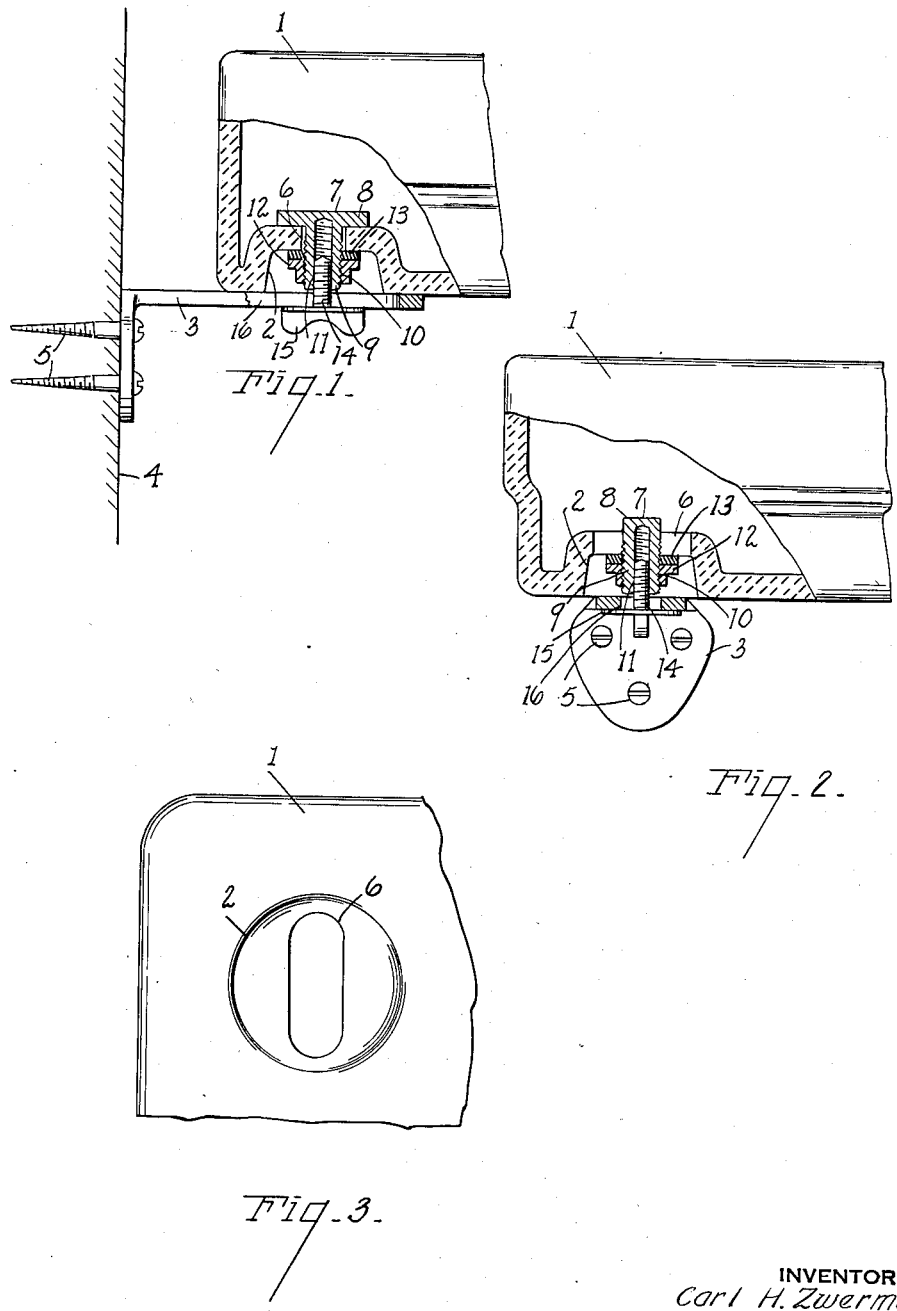
INVENTOR
Carl H. Zwermann
BY
ATTORNEYS Patented Aug. 21, 1934

1,970,791

UNITED STATES PATENT OFFICE 1,970,791

LAVATORY SUPPORT

Carl H. Zwermann, Robinson, Ill.; Helene Zwermann and Carl H. Zwermann, Jr., executrix and executor of said Carl H. Zwermann, deceased Application April 28, 1933, Serial No. 668,370

9 Claims. (Cl. 4—170)

The main objects of this invention are:

First, to provide a lavatory having improved means for affixing it to a wall or the like.

Second, to provide a lavatory having such means in which the fastening means may be inserted in the precast vitreous lavatory to simplify installation.

Third, to provide a lavatory having such means that may be inserted in the factory.

Fourth, to provide a lavatory having such means lying wholly below the surface of the lavatory.

Further objects and advantages pertaining to detail and economies of construction and operation will appear from the description to follow.

A preferred embodiment of my invention is illustrated in the accompanying drawing, in which:

Fig. 1 is a side elevation of a portion of a lavatory and its supporting bracket broken away to show my improved fastening device in section.

Fig. 2 is a similar view from the front of a lavatory.

Fig. 3 is a view of a portion of a lavatory showing the vitreous bowl as it is cast to receive my improved fastening means.

The parts are identified by their numerals of reference which are the same in all views.

1 is a vitreous lavatory. It may be of any of the usual materials used in constructing lavatories. In casting a recess 2 is formed at the point to which it is desired to fasten the supporting bracket. 3 is the supporting bracket fastened to a wall 4 by means of screws 5 or in any other conventional way. In forming the recess 2 I form at the bottom of said recess a slot 6 adapted to receive a T head bolt as will be described.

7 is a bolt having a T head 8 adapted to fit in the slot 6 and to be turned so that its arms engage the sides of the slot 6. This bolt has a shank 9 externally threaded as at 10 and tapped and internally threaded as at 11. In the form of my invention here shown the shank 9 is of such length that when the bolt 7 is in place with its head engaging the sides of the slot 6 the shank 9 does not extend out of the recess beyond the surface of the lavatory 1. A nut 12 threaded to engage the external threads 10 of the shank 9 of the T head bolt is provided to clamp the bolt in position. A washer 13 of leather or like suitable material is provided, and the nut 12 is tightened to clamp the bolt 7 in position. The nut 12 is of a size to lie wholly within the recess as shown.

A bolt 14 screw threaded to fit the internal threads 11 of the shank 9 is also provided. This bolt is shown as having a head 15 with wings for hand tightening.

The bracket 3 is provided with a slot 16 which is of a size to receive the bolt 14 loosely, but is of a size to engage the head 15 of the bolt.

It will be readily understood that in manufacturing the lavatory the recess and slot are cast therein, and the bolt 7 and nut 12 are put in place at the factory. These fasteners extend beyond the surface of the bowl and are not in the way in shipping or handling the article.

When it is desired to install the lavatory the bracket 3 is placed as desired on the wall and the lavatory is placed thereon. The only operation necessary for fastening the lavatory in place is to insert the bolt 14 through the slot 16 into engagement with the threads 11 to complete installation.

It will be understood that with my improved construction the operation of installation is greatly simplified and a better installation is provided. The bracket 3 does not have to engage a flat portion of the lavatory but extending across the recess 2 is sure to engage at two points at least on the lavatory, making a firmer support.

I have shown a preferred embodiment of my invention and desire to claim the same specifically as well as broadly as pointed out in the appended claims.

Having thus described my invention, what I claim as new and desire to secure by Letters Patent is:

1. The combination of a lavatory having a recess in the surface thereof and having a slot in said recess, a bolt having a T-head adapted to be inserted in said slot and to span said slot, said bolt having a shank of a length to lie wholly within said recess when said bolt is in position and having external and internal screw threads, a nut engaging said external threads and lying wholly within said recess to clamp said bolt in said recess, a supporting bracket having a slot therein, and a bolt having a head engaging said bracket, and a shank loosely fitting through said slot having threads engaging the internal threads of said T-head bolt to clamp said lavatory to said bracket.

2. The combination of a lavatory having a recess in the surface thereof and having a slot in said recess, a bolt having a T-head adapted to be inserted in said slot and to span said slot, said bolt having a shank of a length to lie wholly within said recess when said bolt is in position and having external and internal screw threads, a nut engaging said external threads and lying wholly within said recess to clamp said bolt in said recess, and a bolt having threads engaging the internal threads of said T-head bolt.

3. The combination of a lavatory having a recess in the surface thereof and having an opening in said recess, a bolt extending through said opening and having a head adapted to engage said lavatory, said bolt having a shank of a length to lie wholly within said recess when said bolt is in position and having external and internal screw threads, a nut engaging said external threads and lying wholly within said recess to clamp said bolt in said recess, a supporting bracket having a slot therein and a bolt having a head engaging said bracket, and a shank fitting through said slot having threads engaging the internal threads of said first mentioned bolt to clamp said lavatory to said bracket.

4. The combination of a lavatory having a recess in the surface thereof and having an opening in said recess, a bolt extending through said opening and having a head adapted to engage said lavatory, said bolt having a shank of a length to lie wholly within said recess when said bolt is in position and having external and internal screw threads, a nut engaging said external threads and lying wholly within said recess to clamp said bolt in said recess, and a bolt having threads engaging the internal threads of said first mentioned bolt.

5. The combination of a lavatory having a recess in the surface thereof and having a slot in said recess, a bolt having a T-head adapted to be inserted in said slot and to span said slot, said bolt having a shank of a length to lie wholly within said recess when said bolt is in position and having external and internal screw threads, a nut engaging said external threads and lying wholly within said recess to clamp said bolt in said recess, a supporting bracket having a slot therein, and a bolt having a head engaging said bracket, and a shank fitting through said slot having threads engaging the internal threads of said first mentioned bolt to clamp said lavatory to said bracket.

6. In combination, a lavatory having a recess in the surface thereof and an opening in said recess, a bolt extending through said opening and into said recess, means lying wholly within said recess to engage said bolt and clamp it in position, a bracket, and means for engaging said bracket and said bolt to clamp said lavatory to said bracket.

7. In combination, a lavatory having a recess in the surface thereof and an opening in said recess, a bolt extending through said opening and into said recess, means lying wholly within said recess to engage said bolt and clamp it in position, and bracket clamping means for engaging said bolt.

8. In combination, a lavatory having a recess in the surface thereof and an opening in said recess, a bolt extending through said opening and into said recess and having its shank lying wholly within said recess, means lying wholly within said recess to engage said bolt and clamp it in position, a bracket without said recess and extending thereacross, and means for engaging said bracket and said bolt to clamp said lavatory to said bracket.

9. In combination, a lavatory having a recess in the surface thereof and an opening in said recess, a bolt extending through said opening and into said recess and having its shank lying wholly within said recess, means lying wholly within said recess to engage said bolt and clamp it in position, and bracket clamping means for engaging said bolt.

CARL H. ZWERMANN.